(12) United States Patent
Kawamoto et al.

(10) Patent No.: US 8,925,700 B2
(45) Date of Patent: Jan. 6, 2015

(54) TORQUE CONVERTER

(75) Inventors: Takeshi Kawamoto, Yao (JP); Tokimori Saka, Hiroshima (JP); Norio Iwashita, Hiroshima (JP); Takashi Ishiyama, Higashihiroshima (JP); Hidetoshi Maeta, Hiroshima (JP)

(73) Assignees: Exedy Corporation, Osaka (JP); Mazda Motor Corporation, Hiroshima (JP)

( * ) Notice: Subject to any disclaimer, the term of this patent is extended or adjusted under 35 U.S.C. 154(b) by 137 days.

(21) Appl. No.: 13/817,791

(22) PCT Filed: Jul. 27, 2011

(86) PCT No.: PCT/JP2011/004237
§ 371 (c)(1),
(2), (4) Date: Feb. 19, 2013

(87) PCT Pub. No.: WO2012/023240
PCT Pub. Date: Feb. 23, 2012

(65) Prior Publication Data
US 2013/0153352 A1    Jun. 20, 2013

(30) Foreign Application Priority Data

Aug. 20, 2010 (JP) ................... 2010-185245

(51) Int. Cl.
*F16H 45/02* (2006.01)
*F16D 39/00* (2006.01)

(52) U.S. Cl.
CPC ............... *F16D 39/00* (2013.01); *F16H 45/02* (2013.01); *F16H 2045/021* (2013.01); *F16H 2045/0284* (2013.01)
USPC .......................... 192/3.3; 192/55.61; 192/212

(58) Field of Classification Search
CPC .............................................. F16H 2045/0221
See application file for complete search history.

(56) References Cited

U.S. PATENT DOCUMENTS

2001/0027286 A1* 10/2001 Schroder ...................... 192/212
2006/0064970 A1*  3/2006 Tsuzuki et al. ................. 60/361
(Continued)

FOREIGN PATENT DOCUMENTS

JP    2005-155821 A    6/2005
JP    2006-183776 A    7/2006
(Continued)

OTHER PUBLICATIONS

International Search Report; PCT/JP2011/004237; Nov. 1, 2011.

*Primary Examiner* — Rodney H Bonck
(74) *Attorney, Agent, or Firm* — Studebaker & Brackett PC

(57) ABSTRACT

Disclosed is a torque converter (1) which comprises: a casing (10) coupled to an output shaft of an engine; a torus (T) defined by a pump (20), a turbine (30) and a stator (40) each disposed within the casing (10); a lockup clutch (60) adapted to directly couple the turbine (30) and the casing (10); and a lockup damper (70) adapted to absorb shock during engagement of the lockup clutch (60). The turbine (30) has an outer peripheral portion (31a) bulging toward the engine to define a part of the torus (T), an inner peripheral portion (31c) located on the side of the engine with respect to a one-way clutch (50) supporting the stator (40), and an intermediate portion (31b) formed to be concaved toward a side opposite to the engine, in a radial position between the outer peripheral portion (31a) and the inner peripheral portion (31c). A part (75) of the lockup damper (70) is disposed on the side of the engine with respect to the intermediate portion (31b) and in a position axially overlapping with the torus (T). This makes it possible to allow a torque converter to be axially downsized.

4 Claims, 2 Drawing Sheets

(56) References Cited

U.S. PATENT DOCUMENTS

| | | |
|---|---|---|
| 2007/0235277 A1* | 10/2007 | Heuler et al. .................. 192/3.3 |
| 2008/0041684 A1* | 2/2008 | Kuwahata et al. ........... 192/3.29 |
| 2008/0173512 A1 | 7/2008 | Kaneko et al. |
| 2009/0107792 A1* | 4/2009 | Kneidel et al. ............. 192/70.17 |
| 2010/0089046 A1* | 4/2010 | Tomiyama ..................... 60/364 |
| 2011/0011691 A1 | 1/2011 | Tomiyama |

FOREIGN PATENT DOCUMENTS

| | | |
|---|---|---|
| JP | 2008-175338 A | 7/2008 |
| JP | 2009-250288 A | 10/2009 |

\* cited by examiner

TORQUE CONVERTER

TECHNICAL FIELD

The present invention relates to a torque converter of an automatic transmission designed to be mounted in a vehicle.

BACKGROUND ART

A torque converter incorporated in an automatic transmission to transmit an engine power output to a speed change mechanism comprises a pump adapted to be rotated integrally with a crankshaft of an engine, a turbine disposed opposed to the pump and adapted to be driven by the pump through fluid, and a stator disposed between the pump and the turbine and adapted to perform a torque amplifying function. The pump, the turbine and the stator define a torus (a doughnut-shaped fluid working section for causing fluid to circulate therearound).

In order to improve engine fuel economy, the torque converter may further comprise a lockup clutch adapted to be engaged so as to directly couple the pump and the turbine, except when the torque amplifying function is utilized, such as during vehicle starting, and when it is necessary to permit a relative rotation between the pump and the turbine, such as during speed changing. In this case, a lockup damper is provided on an input or output side of the lockup clutch to absorb shock during engagement of the lockup clutch.

As the torque converter having the above structure, there is a type disclosed in the following PTL 1. In this torque converter, a wet multi-pate lockup clutch is disposed between a front cover defining a surface of a casing on the side of an engine and a turbine provided within the casing, and a lockup damper having a damper body and a plurality of damper springs is disposed on an outer peripheral side with respect to the lockup clutch, in such a manner that arrangement positions of the lockup clutch and the lockup damper axially overlap with each other.

CITATION LIST

Patent Literature

[PTL 1]
JP 2008-175338A

SUMMARY OF INVENTION

Technical Problem

In the torque converter disclosed in the PTL 1, members of the lockup damper are disposed on the side of the engine with respect to a region of the torus where an axial dimension of the torus becomes largest, and the lockup clutch is disposed on the side of the engine with respect to the members of the lockup damper. Moreover, in order to ensure a fluid circulation space, an axial dimension of the torus has to be increased to some extent. Thus, if the lockup clutch and the lockup damper are disposed with respect to such a torus in the above positional relationship, there is a problem of an increase in axial dimension of the entire torque converter.

It is therefore an object of the present invention to provide a torque converter capable of facilitating axial downsizing.

Solution to Problem

In order to achieve the above object, the present invention provides a torque converter characterized by the following feature.

The torque converter of the present invention comprises: a casing coupled to an output shaft of an engine; a pump disposed within the casing and adapted to be rotated integrally with the casing; a turbine disposed opposed to the pump from a side of the engine with respect to the pump and adapted to be rotationally driven by the pump through fluid; a stator disposed between the pump and the turbine; a lockup clutch adapted to directly couple the turbine and the casing; and a lockup damper having an elastic member adapted to absorb shock during engagement of the lockup clutch. Within the casing, the pump, the turbine and the stator define a torus which serves as a fluid working section for causing fluid to circulate therearound. The turbine has an outer peripheral portion bulging toward the engine to define a part of the torus, an inner peripheral portion located on the side of the engine with respect to a one-way clutch supporting the stator, and an intermediate portion formed to be concaved toward a side opposite to the engine, in a radial position between the outer peripheral portion and the inner peripheral portion. A part of the lockup damper is disposed on the side of the engine with respect to the intermediate portion and in a position axially overlapping with the torus.

DESCRIPTION OF EMBODIMENTS

The present invention will now be described based on an embodiment thereof.

Figure 1:
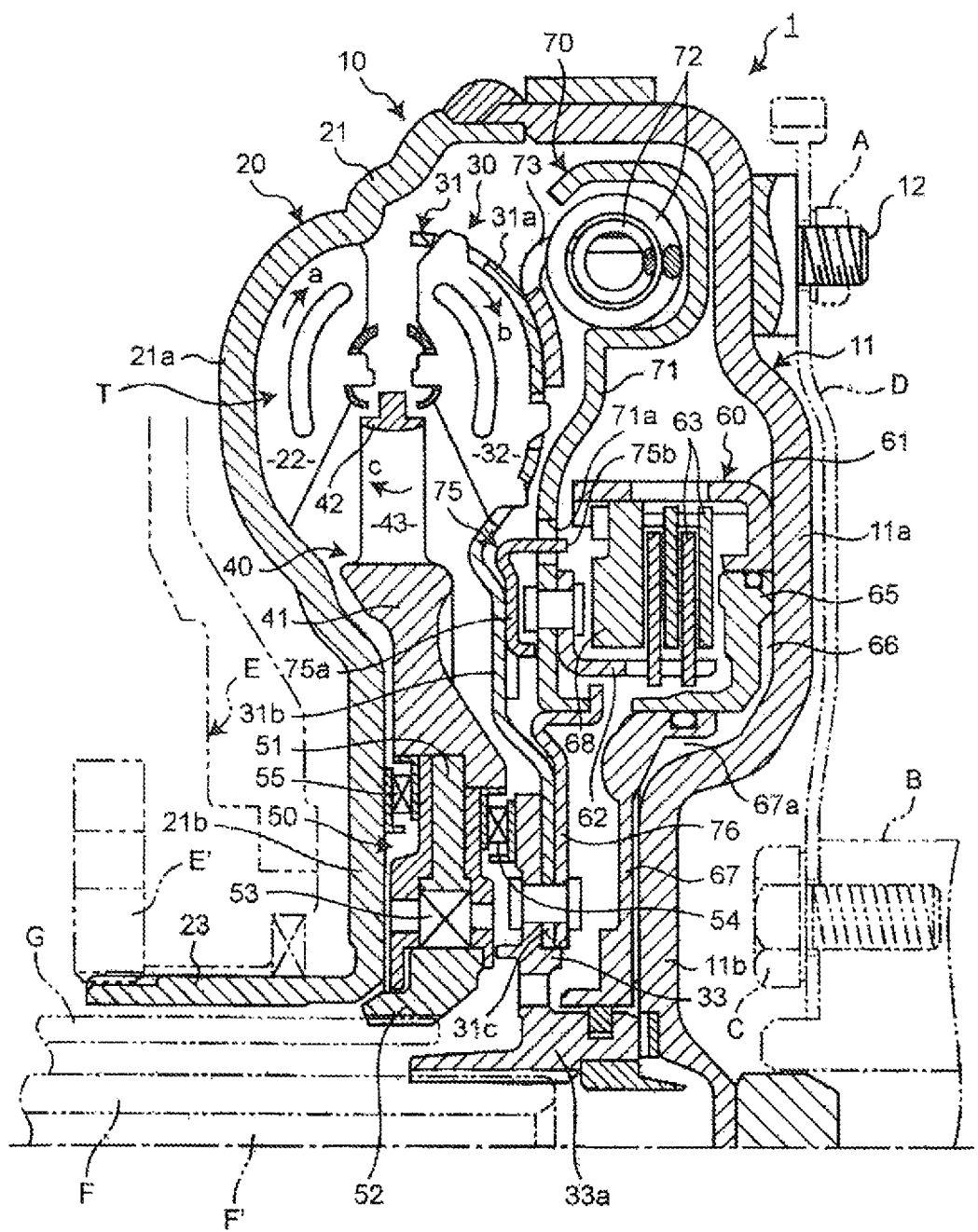
FIG. 1 is a sectional view of a torque converter according to one embodiment of the present invention.

FIG. 1 illustrates a torque converter according to one embodiment of the present invention. The torque converter 1 comprises a casing 10 which forms an outer shell of the torque converter 1. The casing 10 has a front cover 11 which makes up a half of the casing 10 on the side of an engine, and a plurality of stud bolts 12 are fixedly provided on an outer peripheral portion of the front cover 11. On the other hand, a drive plate D is attached to an end of a crankshaft B of the engine through a crank bolt C. Each of the stud bolts 12 is inserted into an outer peripheral portion of the drive plate D. Then, a nut A is screwed onto the inserted stud bolt 12, so that the entire torque converter 1 is coupled to the crankshaft B through the stud bolt 12, the nut A and the drive plate D. When the crankshaft B is rotated during operation of the engine, the front cover 11 is rotationally driven integrally with the crankshaft B.

In the following description, one side closer to the engine (right side in the drawing) will be referred to as "front" or "frontward", and the other side (left side in the drawing) farther away from the engine will be referred to as "rear" or "rearward", for the sake of convenience. Further, the term "outer peripheral side" means a side farther away from an axis of the torque converter (radially outer side), and the term "outer peripheral portion" means a region located on a relatively radially outer side. Conversely, the term "inner peripheral side" means a side closer to the axis of the torque converter (radially inner side), and the term "inner peripheral portion" means a region located on a relatively radially inner side.

As primary components, the torque converter 1 comprises a pump 20, a turbine 30, a stator 40, a one-way clutch 50, a lockup clutch 60, and a lockup damper 70. These components are housed in the casing 10. Further, an internal space of the casing 10 is filled with fluid.

The pump 20 comprises a pump shell 21 which makes up a rear half of the casing 10, and a large number of blades 22 provided on an outer peripheral portion of the pump shell 21. Specifically, the outer peripheral portion of the pump shell 21 is formed to have a rearwardly bulging curved portion 21a, and the large number of blades 22 are arranged on an inner surface of the curved portion 21a in circumferentially side-by-side relation at even intervals. Thus, when the pump shell 21 and the blades 22 are rotated integrally with the front cover 11, the fluid filled in the casing 10 (the front cover 11 and the pump shell 21) is moved while being guided by the blades 22 and the inner surface of the curved portion 21a. Consequently, a fluid flow "a" oriented toward an outer peripheral side and a frontward side while swirling about an axis of the pump shell 21 (casing 10) will be generated.

The pump shell 21 has an inner peripheral end provided with a sleeve 23 which extends rearwardly in such a manner that a distal end of the sleeve 23 is engaged with an inner gear E' of a gear-type oil pump E disposed rearward of the torque converter 1. Thus, when the crankshaft B is rotated, the rotation is transmitted to the oil pump E through the casing 10 and the sleeve 23, so that the oil pump E is driven.

The turbine 30 comprises: a turbine shell 31 which has, in turn from a radially outermost side, an outer peripheral portion 31a, an intermediate portion 31b and an inner peripheral portion 31c; a large number of blades 32 provided on the outer peripheral portion 31a of the turbine shell 31, and a turbine hub 33 joined to the inner peripheral portion 31c of the turbine shell 31, for example, by means of riveting. Specifically, the outer peripheral portion 31a of the turbine shell 31 convexedly curves in a direction opposite to that of the curved portion 21a of the pump shell 21 (in a frontward direction), and the large number of blades 32 are arranged on an inner surface of the curved outer peripheral portion 31a in circumferentially side-by-side relation at even intervals. This turbine 30 (the turbine shell 31, the blades 32, the turbine hub 33) is disposed frontward of the pump 20, and rotatably housed in the casing 10.

The outer peripheral portion (curved portion) 31a of the turbine shell 31 is disposed opposed to the curved portion 21a of the pump shell 21. Based on this arrangement, the flow "a" generated by the rotation of the pump 20 is introduced into the outer peripheral portion 31a of the turbine shell 31. The fluid introduced into the outer peripheral portion 31a is converted to a flow "b" oriented toward an inner peripheral side (radially inner side), by the blades 32 and the inner surface of the outer peripheral portion 31a. In this process, the flow "b" pushes the blades 32, so that the turbine 30 is driven in the same direction as that of the pump 20 while receiving a force in the circumferential direction. The drive force of the turbine 30 is transmitted to a speed change mechanism of an automatic transmission through a turbine shaft F spline-fitted to a boss portion 33a of the turbine hub 33 at an inner peripheral end thereof.

The stator 40 integrally has an inner race portion 41, an outer race portion 42 provided on an outer peripheral side with respect to the inner race portion 41, and a large number of blades 43 provided between the inner race portion 41 and the outer race portion 42 to extend in a radial pattern. The large number of blades 43 are arranged between each of inner peripheral ends of the blades 22 of the pump 20 and a corresponding one of inner peripheral ends of the blades 32 of the turbine 30, in circumferentially side-by-side relation at even intervals. Thus, the fluid flow "b" driving the turbine 30 is introduced rearwardly from the turbine 30, and converted to a flow "c" passing through between adjacent ones of the blades 43.

Then, the flow "c" is introduced into the curved portion 21a of the pump shell 21 from an inner peripheral side thereof, and converted to the flow "a". In this manner, a flow circulating through between respective adjacent ones of the blades 22, 32, 43 of the pump 20, the turbine 30 and the stator 40, is formed. In other words, a doughnut-shaped fluid working section for causing the fluid within the torque converter 1 to circulate therearound, i.e., a torus T, is defined by the pump 20, the turbine 30 and the stator 40.

The one-way clutch 50 is designed to support the stator 40 so as to realize a torque amplifying function based on the stator 40, wherein it comprises an outer race 51, an inner race 52, and a plurality of sprags 53 interposed between the inner and outer races 51, 52. The outer race 51 has an outer peripheral edge surface which is press-fitted in an inner peripheral edge surface of the inner race portion 41 of the stator 40, and the inner race 52 has an inner peripheral edge surface which is spline-fitted with a distal end of a stator shaft G which is a fixed member fastened to a transmission housing of the automatic transmission.

An axial position of the outer race 51 is restricted by a thrust bearing 54 provided between the outer race 51 and the turbine hub 33 located frontward thereof, and a thrust bearing 55 provided between the outer race 51 and an inner peripheral portion of the pump shell 21 located rearward thereof, so that the stator 40 is axially positioned with respect to the pump 20 and the turbine 30.

Thus, when a pushing force based on the fluid flow "c" acts on one of opposite surfaces of each of the blades 43 and thereby the stator 40 receives a rotational force in one direction, the one-way clutch 50 runs idle to allow the stator 40 to be freely rotated. On the other hand, when the pushing force acts on the other surface of each of the blades 43 and thereby the stator 40 receives a rotational force in the other direction, the one-way clutch 50 is locked to immobilize the stator 40. In this process, the torque amplifying function is exhibited to amplify torque input from the engine into the pump 20. The amplified torque is output from the turbine 30 to the turbine shaft F.

In this case, generally, a torque amplifying function providing a torque ratio of 1 or more is obtained when a speed ratio is in the range of 0 to 0.8 or 0.9, wherein the torque ratio (torque amplification ratio) becomes largest when the speed ratio is 0.

The lockup clutch 60 comprises: a clutch drum 61 and a clutch hub 62 which are concentrically arranged; a plurality of friction plates 63 arranged between the clutch drum 61 and the clutch hub 62 and alternately engaged therewith; and a piston 65 provided to be slidably movable along an inner peripheral surface of a front end of the clutch drum 61.

An oil pressure chamber 66 is defined on a back side of the piston 65, i.e., between the piston 65 and an inner surface of the front cover 11. When a working oil pressure is introduced from an oil hole F' provided in the turbine shaft F into the oil pressure chamber 66, through an oil passage 67a defined between the front cover 11 and a plate member 67 fixedly attached onto the inner surface of the front cover 11, the plurality of friction plates 63 are pressed toward a retaining plate 68 by the piston 65, and thereby the lockup clutch 60 is engaged.

The lockup damper 70 comprises a retainer plate 71, and a plurality of damper springs 72 (elastic members) each disposed to circumferentially extend along the retainer plate 71. The retainer plate 71 is provides with a non-illustrated spring catching portion which catches one end of each of the damper springs 72, and the outer peripheral portion of the turbine shell 31 is fixedly provided with a spring catching member 73, wherein the spring catching member 73 protrudes frontwardly from an outer surface of the turbine shell 31 so as to catch the other end of each of the damper springs 72. The retainer plate 71 has an inner peripheral portion joined to the clutch hub 62 of the lockup clutch 60, for example, by means of riveting.

Thus, when the lockup clutch 60 is engaged, the rotation of the front cover 11, i.e., the rotation of the crankshaft B, is input into the retainer plate 71 of the lockup damper 70 through the lockup clutch 60, and the force input into the retainer plate 71 is transmitted from the spring catching member 73 to the turbine 30 while compressing the damper springs 72.

Figure 2:
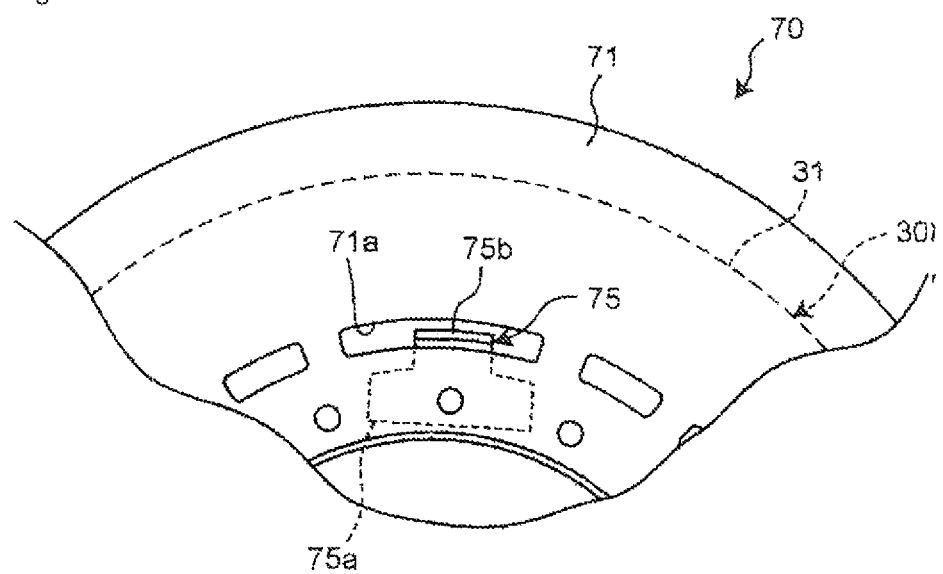
FIG. 2 is a front view of a damper, when viewed from the side of an engine.

The lockup damper 70 further comprises a plurality of damper stoppers 75 for preventing excessive compression of the damper springs 72. The plurality of damper stoppers 75 are provided in circumferentially spaced-apart relation to each other correspondingly to respective ones of the plurality of damper springs 72. Each of the damper stoppers 75 has a base portion 75*a* fixedly attached to the intermediate portion 31*b* of the turbine shell 31, for example, by welding, and a stopper portion 75*b* protruding frontwardly from the base portion 75*a*. The stopper portion 75*b* is inserted into a circumferentially-long elongate hole 71*a* provided in the retainer plate 71. This makes it possible to restrict a relative rotation between the damper stopper 75 and the retainer plate 71 to a given distance so as to prevent excessive compression of the damper springs 72, as shown in FIG. 2.

The damper stopper 75 is disposed between the lockup clutch 60 and the intermediate portion 31*b* of the turbine shell 31, i.e., disposed on a rear side (on a side opposite to the engine) with respect to the lockup clutch 60 and in a position radially overlapping with the lockup clutch 60.

An operation of the torque converter 1 according to this embodiment will be described below. In a non-engagement state of the lockup clutch 60, such as during vehicle starting and during speed changing, the turbine 30 is driven by the pump 20 rotated integrally with the crankshaft B of the engine, through the fluid circulating within the torus T, so that driving force is transmitted to the speed change mechanism through the turbine shaft F. In this process, in a converter region having a speed ratio equal to or less than about 0.8 to 0.9, engine output torque is amplified by the torque amplifying function of the stator 40, and then output to the speed change mechanism.

On the other hand, in an operating state other than during vehicle starting and during speed changing, when a working oil pressure is supplied from the oil hole F provided in the turbine shaft F to the oil pressure chamber 66 through the oil passage 67*a*, etc., the lockup clutch 60 is engaged, and the front cover 11 of the casing 10 and the turbine 30 are coupled through the lockup damper 70 (lockup mode). In the lockup mode, engine output torque is transmitted from the crankshaft B to the turbine 30 through the casing 10, the lockup clutch 60 and the lockup damper 70 in a direct manner. In this manner, engine output torque is transmitted to the speed change mechanism without through fluid, so that rotational energy transmission efficiency is improved as compared to that in the non-engagement state of the lockup clutch 60, to provide improved engine fuel economy.

In order to suppress shock during engagement of the lockup clutch 60, during an operation of engaging the lockup clutch 60, an oil pressure to be supplied to the oil pressure chamber 66 is controlled to allow the lockup clutch 60 to be set in a slip mode once, and then fully engaged. In this case, when the plurality of friction plates 63 of the lockup clutch 60 start coming into contact with each other to initiate torque transmission, the damper springs 72 of the lockup damper 70 are compressed to absorb shock in an initial stage of torque transmission, so that the lockup clutch 60 will be smoothly engaged.

A shape, arrangement, etc., of each of the components of the torque converter 1 according to this embodiment, and corresponding advantageous effects, will be described below.

The torus T defined on an outer peripheral side of a space between the turbine shell 31 and the pump shell 21 has a relatively large axial dimension. This is because it is necessary to increase an inner diameter of the torus T to some extent so as to sufficiently ensure an amount of fluid circulating within the torus T to prevent deterioration in characteristics, such as capacity and transmission efficiency, of the torque converter 1.

The one-way clutch 50 is provided in a position away from the torus T in a radially inner side, i.e., in an inner peripheral region of a space between the turbine shell 31 and the pump shell 21, while being offset frontwardly with respect to a center of the torus T. In contrast, there is only the inner race portion 41 of the stator 40, in a radially intermediate region of the space between the torus T and the one-way clutch 50.

Thus, the outer peripheral portion 31*a*, the intermediate portion 31*b* and the inner peripheral portion 31*c* of the turbine shell 31 have the following shapes, respectively. The outer peripheral portion 31*a* has a curved shape which bulges frontwardly (toward the engine) to define a part of the torus T, and the inner peripheral portion 31*c* bulges frontwardly (toward the engine) to avoid the one-way clutch 50. In contrast, the intermediate portion 31*b* of the turbine shell 31 located radially between the outer peripheral portion 31*a* and the inner peripheral portion 31*c* is formed as a constricted portion concaved rearwardly (on the side opposite to the engine). Each of the damper stoppers 75 is fixedly attached to the intermediate portion (constricted portion) 31*b*. In other words, the damper stopper 75 is disposed on the side of the engine with respect to the intermediate portion 31*b* and in a position axially overlapping with the torus T.

Thus, the damper stopper 75 can be disposed farther away from the engine, and the lockup clutch 60 located closer to the engine with respect to the damper stopper 75 can also be disposed farther away from the engine, so that it becomes possible to facilitate a reduction in axial dimension of the torque converter 1.

Note that, a radially intermediate portion of the front cover 11 is formed as a bulging portion 11*a* bulging frontwardly, so that an axial space is ensured between the bulging portion of the front cover 11 and the intermediate portion 31*b* of the turbine shell 31 to house the lockup clutch 60.

In addition, each of the damper springs 72 of the lockup damper 70 is disposed in an outermost peripheral region of a space between the front cover 11 and the turbine shell 31, i.e., on a radially outer side with respect to the lockup clutch 60, and in a position axially overlapping with the lockup clutch 60. This makes it possible to suppress an increase in axial dimension of the torque converter 1 due to the lockup clutch 60 and the lockup damper 70 housed in the casing 10, or a resulting increase in overall length of an automatic transmission.

Further, the lockup clutch 60 and the lockup damper 70 are disposed, respectively, on a radially inner side and on a radially outer side, so that it becomes possible to enhance a shock absorbing effect during engagement of the lockup clutch 60, and accurately perform a slip control in an initial stage of the operation of engaging the lockup clutch 60. Thus, shock during engagement of the lockup clutch will be effectively suppressed.

On the other hand, the front cover 11 has a rearwardly concaved depressed portion 11b formed on an inner peripheral side with respect to the bulging portion 11a for housing the lockup clutch 60, and a head of the crank bolt C is disposed within the depressed portion 11b. This allows the front cover 11 or the entire torque converter 1 to be disposed closer to the engine.

Further, the one-way clutch 50 is disposed at a position offset frontwardly with respect to the center of the torus T. Correspondingly, an inner peripheral portion (a portion on an inner peripheral side with respect to the curved portion 21a) of the pump shell 21 located rearward of the one-way clutch 50 is formed as a frontwardly concaved depressed portion 21b. Thus, the depressed portion 21b can be utilized to allow the oil pump E located rearward thereof to be disposed closer to the engine.

Based on the above configuration where the head of the crank bolt C is disposed within the depressed portion 11b of the front cover 11, and the oil pump E is disposed closer to the engine by utilizing the depressed portion 21b of the pump shell 21, an axial distance between the oil pump E and the head of the crank bolt C can be reduced, so that the overall length of the automatic transmission will be effectively shortened.

Although one embodiment of the present invention has been described, the present invention is not limited to the above embodiment. For example, although the above embodiment has been described based on an example where each of the damper stoppers 75 is disposed on the side of the engine with respect to the intermediate portion 31b of the turbine 30, any member other than the damper stoppers 75 may be disposed in this position, as long as the member is a part of the lockup damper 75.

Finally, an outline of features and advantageous effects based on the contents of the above embodiment will be described below.

A torque converter comprises: a casing coupled to an output shaft of an engine; a pump disposed within the casing and adapted to be rotated integrally with the casing; a turbine disposed opposed to the pump from a side of the engine with respect to the pump and adapted to be rotationally driven by the pump through fluid; a stator disposed between the pump and the turbine; a lockup clutch adapted to directly couple the turbine and the casing; and a lockup damper having an elastic member adapted to absorb shock during engagement of the lockup clutch. Within the casing, the pump, the turbine and the stator define a torus which serves as a fluid working section for causing fluid to circulate therearound. The turbine has an outer peripheral portion bulging toward the engine to define a part of the torus, an inner peripheral portion located on the side of the engine with respect to a one-way clutch supporting the stator, and an intermediate portion formed to be concaved toward a side opposite to the engine, in a radial position between the outer peripheral portion and the inner peripheral portion. A part of the lockup damper is disposed on the side of the engine with respect to the intermediate portion and in a position axially overlapping with the torus.

In the above structure, the intermediate portion of the turbine is formed as a portion concaved toward the side opposite to the engine, and a part of the lockup damper is disposed on the side of the engine with respect to the concaved portion and in a position axially overlapping with the torus, so that the part of the lockup damper can be disposed farther away from the engine. This makes it possible to suppress jutting-out of the lockup damper toward the engine so as to reduce an axial dimension of the entire torque converter.

Preferably, the part of the lockup damper is a damper stopper for restricting excessive compression of the elastic member.

When the damper stopper is disposed on the side of the engine with respect to the intermediate portion and in a position axially overlapping with the torus, in this manner, the effect of the present invention can be reliably achieved.

Preferably, the lockup clutch is disposed on the side of the engine with respect to the part of the lockup damper and in a position radially overlapping with the part of the lockup damper.

According to this feature, the lockup clutch is disposed on the side of the engine with respect to the part of the lockup damper which is disposed farther away from the engine. In this case, the lockup clutch can also be disposed farther away from the engine, so that it becomes possible to effectively reduce an axial dimension of the entire torque converter.

Preferably, the elastic member is disposed on a radially outer side with respect to the lockup clutch and in a position axially overlapping with the lockup clutch.

According to this feature, the lockup clutch and the elastic member of the lockup damper are disposed in axially overlapping relation, so that it becomes possible to further facilitate the reduction in axial dimension of the entire torque converter.

As described above, the present invention allows a torque converter to be axially downsized. Thus, the present invention is suitably usable in the technical field of manufacturing of this type of torque converter or automatic transmission, or a vehicle mounting the automatic transmission.

The invention claimed is:

1. A torque converter comprising: a casing coupled to an output shaft of an engine; a pump disposed within the casing and adapted to be rotated integrally with the casing; a turbine disposed opposed to the pump from a side of the engine with respect to the pump and adapted to be rotationally driven by the pump through fluid; a stator disposed between the pump and the turbine; a lockup clutch adapted to directly couple the turbine and the casing; and a lockup damper adapted to absorb shock during engagement of the lockup clutch, wherein the pump, the turbine and the stator define a torus which serves as a fluid working section for causing fluid within the casing to circulate therearound, and wherein:

the turbine has an outer peripheral portion bulging toward the engine to define the torus with the pump and the stator, an inner peripheral portion located on the side of the engine with respect to a one-way clutch supporting the stator, and an intermediate portion formed to be concaved toward a side opposite to the engine with respect to both of the outer peripheral portion and the inner peripheral portion, in a radial position between the outer peripheral portion and the inner peripheral portion;

the lockup damper has an elastic member capable of being compressed to absorb shock during engagement of the lockup clutch, and a damper stopper for restricting excessive compression of the elastic member;

the damper stopper is disposed on the side of the engine with respect to the intermediate portion of the turbine and in a position axially overlapping with the torus;

the elastic member is disposed on the side of the engine with respect to the outer peripheral portion of the turbine; and the one-way clutch is disposed at a position offset to the side of the engine with respect to a center of the torus.

2. The torque converter as defined in claim 1, wherein the damper stopper is fixed to the intermediate portion of the turbine.

3. The torque converter as defined in claim 2, wherein the lockup clutch is disposed on the side of the engine with respect to the damper stopper and in a position radially overlapping with the damper stopper.

4. The torque converter as defined in claim 1, wherein the lockup clutch is disposed on the side of the engine with respect to the damper stopper and in a position radially overlapping with the damper stopper.

* * * * *